TWO-LEVEL QUANTIZATION SYSTEM
Filed April 21, 1961
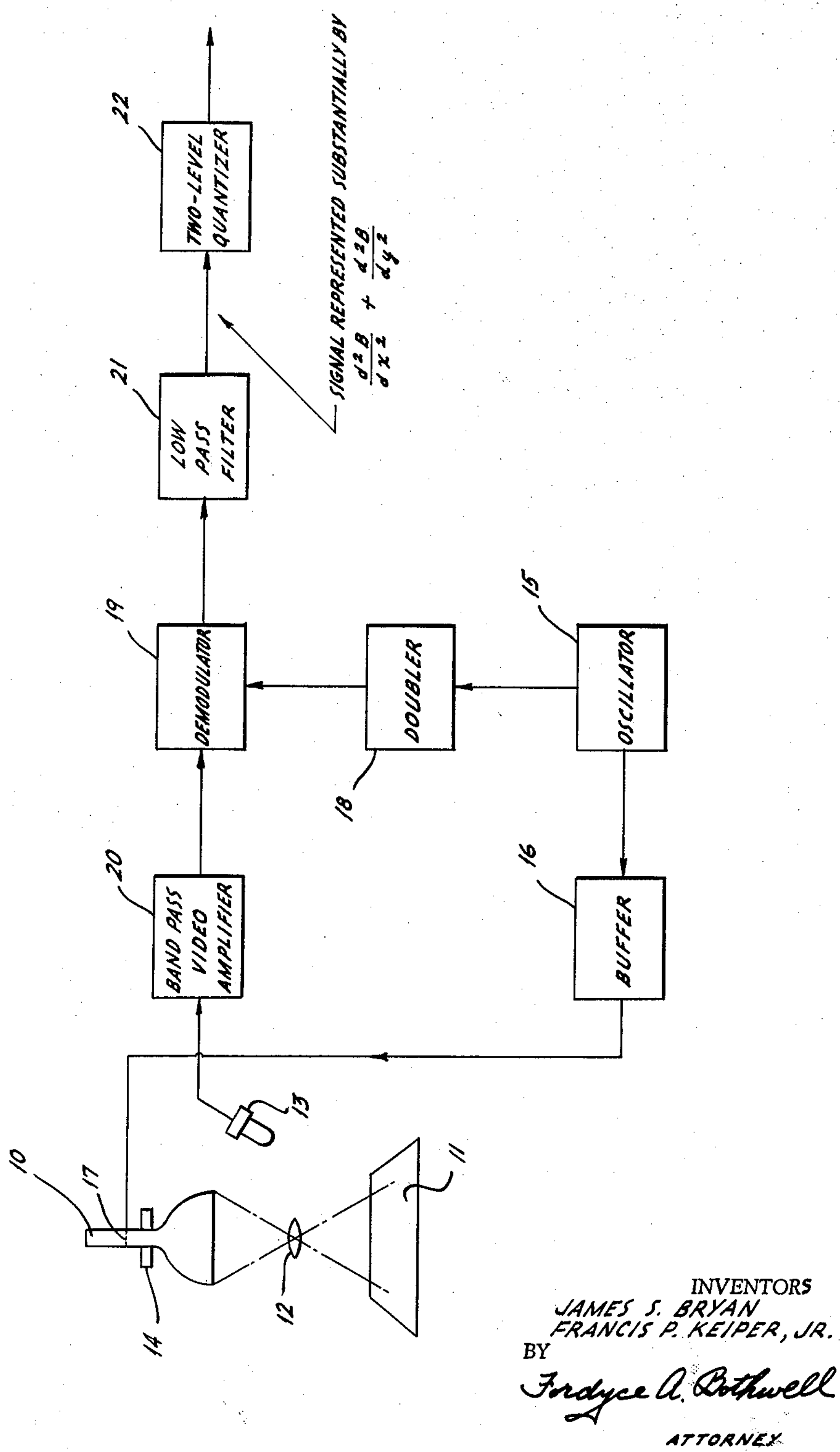
INVENTORS
JAMES S. BRYAN
FRANCIS P. KEIPER, JR.
BY
Fordyce A. Bothwell
ATTORNEY United States Patent Office 3,189,685

Patented June 15, 1965

3,189,685

TWO-LEVEL QUANTIZATION SYSTEM

James S. Bryan, Hatboro, and Francis P. Keiper, Jr., Oreland, Pa., assignors, by mesne assignments, to Philco Corporation, Philadelphia, Pa., a corporation of Delaware Filed Apr. 21, 1961, Ser. No. 104,664

3 Claims. (Cl. 178—7.1)

This invention relates to the production of a two-level quantized signal representative of a monochrome (black and white) picture or image, in which signal the two-level quantization is representative of black and white.

The invention is applicable, for example, to character reading, i.e. recognition of information poorly displayed as in a document such as a photograph, the details of which are not easily discernible. In a character reading system, a signal is produced which is representative of the information to be "read," and in some such systems the signal is quantized to two levels, representing black and white, before the signal is further processed.

As is well known, a monochrome picture or image signal may be produced by scanning the picture or image in successive lines. While two-level quantization of the picture information is sometimes desirable, when a picture is simply line scanned and the picture signal thus produced is quantized to two levels, the resulting signal may not be entirely satisfactory in some instances.

The principal object of the present invention is to produce a signal which is very well suited for two-level quantization.

This invention is based on the concept of utilizing second spatial derivatives of brightness of a picture or image in a system employing two-level quantization. More particularly, this invention is based on the concept that (1) for optimum quantization it is necessary to take into account brightness changes both along a line of scan and transverse thereto, and (2) the sum of the second spatial derivatives of brightness both along a line of scan and transverse thereto is ideally suited for optimum two-level quantization. Thus in accordance with this invention a signal is produced which is represented substantially by the expression $$\frac{d^2B}{dx^2}+\frac{d^2B}{dy^2}$$

where B is brightness, $x$ is the direction of line scan, and $y$ is a direction transverse to the line scanning direction, and this signal is supplied to a two-level quantizer.

The reason why this signal is ideally suited for optimum two-level quantization may be explained as follows. Where there is a sharp transition in brightness of a picture or image between black and white, the second spatial derivative of brightness peaks in opposite directions and the point at which it changes sign corresponds to the point of inflection of the brightness. It can therefore be used to actuate a two-level quantizer such as a flip-flop circuit. Since sharp brightness transitions may be encountered in any direction in a small area of the picture or image, the sum of the second spatial derivatives of brightness in two directions depicts the said area. For example, if a sharply focussed beam were scanning closely parallel to a sharp transition, it would not sense such transition. But if the beam were caused to wobble, it would then sense the transition.

The second spatial derivative signal utilized by this invention may be derived by employing techniques heretofore proposed for use in television aperture correction. As described in the Journal of the Society of Motion Picture and Television Engineers, vol. 64, December 1955, pp. 660–670, vertical or transverse aperture correction information can be derived either by focus wobble or by vertical wobble of the beam. A signal derived by the wobbling technique as described in said publication is the signal represented substantially by the expression $$\frac{d^2B}{dx^2}+\frac{d^2B}{dy^2}$$

which is required for the purpose of the present invention.

Referring now to the accompanying drawing, the single figure thereof is a block diagram of an embodiment of this invention as applied by way of example to a character reading system.

In the illustrated system, the flying spot scanner 10 serves to effect light beam scanning of a picture or image 11 through the medium of lens 12, and the reflected light activates a phototube 13, e.g. a photomultiplier, to produce the video carrier signal. As in one form of aperture correction system described in the above-mentioned publication, concurrently with the scanning deflection of the electron beam in scanner 10 by the deflection yoke 14, the beam may be subjected to focus wobble. Thus in the illustrated system a focus-wobbling signal is supplied from oscillator 15 via buffer 16 to a focussing electrode 17 in the scanner tube. The same signal from oscillator 15 is doubled in frequency by doubler 18 and is supplied to demodulator 19, to which the video carrier signal is also supplied via band pass amplifier 20. The output of the demodulator is the second spatial derivative signal which is required for the purpose of this invention. This signal is supplied via low pass filter 21 to the two-level quantizer 22 which may be a bistable or flip-flop circuit and which is actuated by excursions of the signal representative of transitions between black and white.

The signal thus supplied to the two-level quantizer and represented substantially by the expression $$\frac{dB^2}{dx^2}+\frac{d^2B}{dy^2}$$

contains the picture information since it represents the rates of change of brightness changes in all directions. Moreover this signal accurately indicates points of inflection of the brightness changes, and it optimizes the two-level quantization.

While a single embodiment of the invention is illustrated, it will be appreciated that the invention is not limited thereto. For example, instead of focus wobble the beam in the scanner tube may be subjected to transverse wobble, with conventional circuits added to obtain the second derivative $$\frac{d^2B}{dt^2}$$

which is equal to $$\frac{d^2B}{dx^2}$$

From the foregoing description it will be apparent that the essence of the invention is the production of a signal which represents substantially the sum of the second spatial derivatives of brightness of a picture or image in two directions, and the two-level quantization of such signal.

We claim:

1. In a system for producing a picture or image representative signal quantized to two levels representing black and white, means for producing a signal represented substantially by the sum of the second spatial derivatives of brightness of the picture or image in two directions, and means responsive to said last-named signal to provide a two-level signal whose levels respectively represent black and white areas of the picture or image.

2. In a system for producing a picture or image representative signal quantized to two levels representing black and white, means for producing a signal represented substantially by the expression $$\frac{d^2B}{dx^2}+\frac{d^2B}{dy^2}$$

where B is brightness, $x$ is the direction of line scanning of the pitcure or image, and $y$ is a direction transverse to the line scanning direction, and means responsive to said last-named signal to provide a two-level signal whose levels respectively represent black and white areas of the picture or image.

3. In a system for producing a picture or image representative signal quantized to two levels representing black and white, a flying spot scanner for effecting scanning of the picture or image in successive lines, an oscillator connected to said scanner to effect auxiliary wobble scanning in the course of each line scanning of the picture or image, a phototube arranged to receive reflected light from the picture or image, a band pass video amplifier connected to said phototube, a demodulator connected to said amplifier, a frequency doubler interconnecting said oscillator and said demodulator to supply to the demodulator a signal having a frequency twice that of said oscillator, a low pass filter connected to said demodulator to receive the output thereof and to supply a signal represented substantially by the sum of the second spatial derivatives of brightness of the picture or image in the line scanning direction and transverse thereto, and a two-level quantizer connected to said filter to produce in response to said last-mentioned signal a two-level signal whose levels respectively represent black and white areas of the picture or image.

References Cited by the Examiner

UNITED STATES PATENTS

| | | | |
|---|---|---|---|
| 2,899,495 | 8/59 | Gibson | 178—7.2 |
| 2,962,548 | 11/60 | Taudt | 178—7.1 |
| 3,017,456 | 1/62 | Schreiber | 178—7.3 |

DAVID G. REDINBAUGH, *Primary Examiner.*

NEWTON LOVEWELL, ROY LAKE, *Examiners.*